United States Patent
Melament et al.

(10) Patent No.: US 7,225,308 B2
(45) Date of Patent: May 29, 2007

(54) INEXPENSIVE RELIABLE COMPUTER STORAGE VIA HETERO-GENEOUS ARCHITECTURE AND A STAGED STORAGE POLICY

(75) Inventors: Alex Melament, Kiryat Bialik (IL); Alexey Roytman, Yokneam (IL); Gal Shachor, Yokneam (IL); Uri Shani, Givat Adi (IL)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 10/697,186

(22) Filed: Oct. 30, 2003

(65) Prior Publication Data

US 2005/0097287 A1    May 5, 2005

(51) Int. Cl.
*G06F 12/00* (2006.01)
(52) U.S. Cl. .................. 711/162; 711/161; 707/203; 707/204
(58) Field of Classification Search ........... 711/161, 711/162, 129, 130; 707/203, 204
See application file for complete search history.

(56) References Cited

U.S. PATENT DOCUMENTS

| | | | | |
|---|---|---|---|---|
| 5,148,537 A | * | 9/1992 | Belsan | ............ 711/131 |
| 5,392,244 A | * | 2/1995 | Jacobson et al. | ............ 711/114 |
| 5,696,934 A | * | 12/1997 | Jacobson et al. | ............ 714/5 |
| 5,790,176 A | * | 8/1998 | Craig | ............ 725/115 |
| 6,442,601 B1 | * | 8/2002 | Gampper et al. | ............ 709/218 |
| 6,549,992 B1 | * | 4/2003 | Armangau et al. | ............ 711/162 |
| 6,609,183 B2 | * | 8/2003 | Ohran | ............ 711/161 |
| 2004/0034752 A1 | * | 2/2004 | Ohran | ............ 711/161 |

* cited by examiner

*Primary Examiner*—Sanjiv Shah
*Assistant Examiner*—Yaima Campos
(74) *Attorney, Agent, or Firm*—Suzanne Erez

(57) ABSTRACT

An inexpensive storage system is disclosed along with methods of managing such a system. In one preferred embodiment, the system includes a high performance high reliability storage medium configured for initial storage of data, a low performance high reliability storage medium configured for backup of data initially stored on the high performance high reliability storage medium, and a high performance low reliability storage medium, configured to receive data transferred from the high performance high reliability storage medium, after the data has been backed up on the low performance high reliability storage medium. This significantly reduces the cost of the system without substantially comprising performance. Reliability is likewise maintained owing to the high reliability backup.

12 Claims, 3 Drawing Sheets

INEXPENSIVE RELIABLE COMPUTER STORAGE VIA HETERO-GENEOUS ARCHITECTURE AND A STAGED STORAGE POLICY

FIELD AND BACKGROUND OF THE INVENTION

The present invention relates to the reliability, performance and cost of computer storage.

The computer storage industry rates storage along several dimensions which include reliability, performance, and cost. Reliable computer storage can be defined as a storage medium on which the mean time between failures (MTBF) is very high, where failure refers to loss of data and "very high" is relative to other storage media. The performance of a computer storage medium can be defined by the number of random read/write/rewrite operations in a unit of time that can occur in that medium. The more operations that can occur in a unit of time, the higher the performance. The cost of computer storage is typically a function of performance P, reliability R and size S. For example, a first order formula for cost is $$\text{Cost} = (a*P + b*R)*c*S$$

where a, b, and c are market and technology driven constants and * is the multiplication symbol. In accordance with this formula, storage is more expensive when performance is higher, reliability is higher or size is larger.

For example, a tape medium is typically inexpensive, providing low performance and high reliability. As another example, magnetic disk systems are expensive, and provide very high performance compared with tapes. A basic magnetic disk system is also low in reliability compared with tapes, although there are ways to make it more reliable as explained below. Even a basic disk system costs more than tapes owing mainly to the mechanical nature of the media compared with the simple tape cassette housing a plastic tape coated with a magnetically recording thin layer.

Magnetic disk systems can be rendered more reliable while maintaining high performance via various technological enhancements, but at an increased cost to the systems. For example, a system which uses a Redundant Array of Inexpensive Disks also known as Redundant Array of Independent Disks (RAID) stores the same data in different places (thus, redundantly) on multiple hard disks. By placing data on multiple disks, I/O operations can overlap in a balanced way, improving performance. Since the use of multiple disks increases the mean time between failure, storing data redundantly also increases fault-tolerance. Therefore usage of a RAID provides relatively high reliability via redundancy, while preserving high performance, but also increasing cost.

A heterogeneous storage system comprises a mix of storage components having differing cost, performance and/or reliability and therefore differing advantages and disadvantages. For example, a typical prior art heterogeneous storage system includes expensive, high performance, high reliability magnetic disk storage (for example RAID) plus low cost, low performance, high reliability secondary storage (for example tapes or magnetic/optics such as Magneto Optical (MO), Compact Disc (CD), Digital Versatile Disc also known as Digital Video Disc (DVD) etc.)

FIG. 1 depicts a prior art heterogeneous storage system 100 which allows storage and retrieval of data by client(s) 110. The client 110 shown in FIG. 1 represents all clients which access storage system 100 and does not necessarily always refer to the same client. For example the storing client may in some cases differ from the retrieving client. Client 110 stores data in heterogeneous storage system 100 (arrow 150). The data is initially stored in a high-reliability high-performance storage 120. It is assumed that the data is eventually backed up on secondary (high-reliability low-performance) storage 140 (arrows 160 and 165), with the timing of the backup determined by a storage policies sub-unit 130. Once the data has been backed up, it is possible that the data will be eliminated immediately from high performance storage 120, or will later be eliminated from high-performance storage 120, for example once storage 120 is full and new data is sent for storage. In effect, the secondary storage 140 archives the data when it is no longer likely to be required on an ongoing basis and, to this extent, is off-line and therefore not directly accessible.

During the retrieval process, client 110 requests retrieval of the data from heterogeneous storage system 100. The data is provided to client 110 (arrow 180). Depending on the location of the data, the data could have been retrieved from high performance storage 120 (broken arrow 170) or from secondary storage 140 (broken arrow 190). In the latter case, data is no longer on-line and directly accessible and must be restored from the secondary storage 140. For example, in the common situation where the secondary storage is a tape unit, the correct tape must first be located, then wound on the tape reader and only then may the stored data be retrieved. This is reliable but time-consuming.

SUMMARY OF THE INVENTION

It is an object of the present invention to provide an improved heterogeneous system for storage of computer readable data where backed-up data can be retrieved faster.

It is a further object of the invention to reduce the costs of the storage systems compared with hitherto-proposed systems having similar performance.

These objects are realized in accordance with a first aspect of the invention by a method of storage management, the method comprising:

storing data on a high reliability high performance storage medium;

backing up said data on a high reliability low performance storage medium; and after said backing up, copying at least some of said data from said high reliability high performance storage medium to a low reliability high performance storage medium and freeing space occupied thereby on the high reliability high performance storage medium.

In accordance with a further aspect of the invention, there is provided a system for storing computer-readable media, said system comprising:

a high performance high reliability storage medium configured for initial storage of data;

a low performance high reliability storage medium configured for backup of data initially stored on said high performance high reliability storage medium; and a high performance low reliability storage medium, configured to receive data transferred from said high performance high reliability storage medium, after said data has been backed up on said low performance high reliability storage medium.

Thus, the invention provides a high performance (i.e. fast) backup storage that is on-line in addition to the conventional low performance (i.e. slow) backup (such as tape etc.) that is usually off-line and is still used. The additional high performance backup storage provided by the invention is of lower reliability than the high performance high reliability storage medium, which is expensive, but allows the quantity of high performance high reliability storage medium to be reduced. This significantly reduces the cost of the system without substantially comprising performance. Reliability is likewise maintained owing to the high reliability backup.

BRIEF DESCRIPTION OF THE DRAWINGS

The invention is herein described, by way of example only, with reference to the accompanying drawings, wherein.

DETAILED DESCRIPTION OF THE INVENTION

A preferred embodiment of the present invention includes a heterogeneous storage system which is inexpensive compared to prior art heterogeneous storage systems.

The principles and operation of a heterogeneous storage system according to the present invention may be better understood with reference to the drawings and the accompanying description. All examples given below are non-limiting illustrations of the invention described and defined herein.

In the description below, the significance of the terms "low performance" and "low reliability" for storage media are in comparison with the terms "high performance" and "high reliability", respectively. The terms "high" and "low" should be understood as relative to each other. For example, in one embodiment, "high" and "low" performance or reliability, as the case may be, may involve a separation of at least one order of magnitude in performance or reliability respectively. As is well known, an order of magnitude is change of plus or minus 1 in the exponent of a value of a quantity or unit. Therefore in this one embodiment and assuming base 10, the performance (or reliability) of a high performance (or reliability) storage would be at least 10 times better than the performance (or reliability) of a low performance (or reliability) storage. It should be evident that the terms "high" and "low" when applied to performance or reliability will always be relative since the ongoing improvements in storage media characteristics militate against an absolute definition. However, this is not important since such improvements affect all kinds of storage media and therefore high performance storage media will continue to maintain their edge over their low performance counterparts; and the same will also apply, of course, to high and low reliability storage media.

Figure 1:
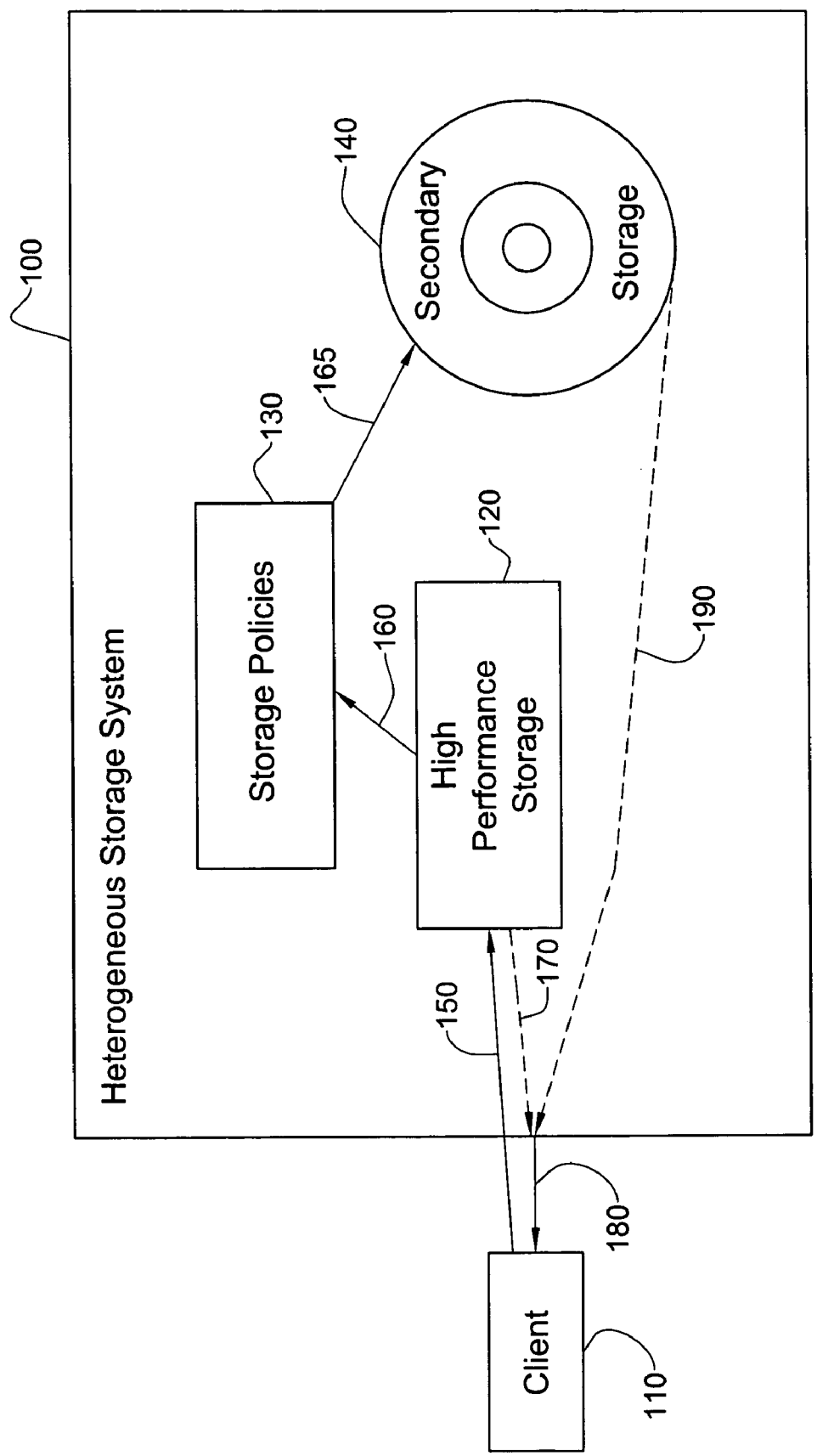
FIG. 1 illustrates the components and operation of a prior art heterogeneous storage system.
Figure 2:
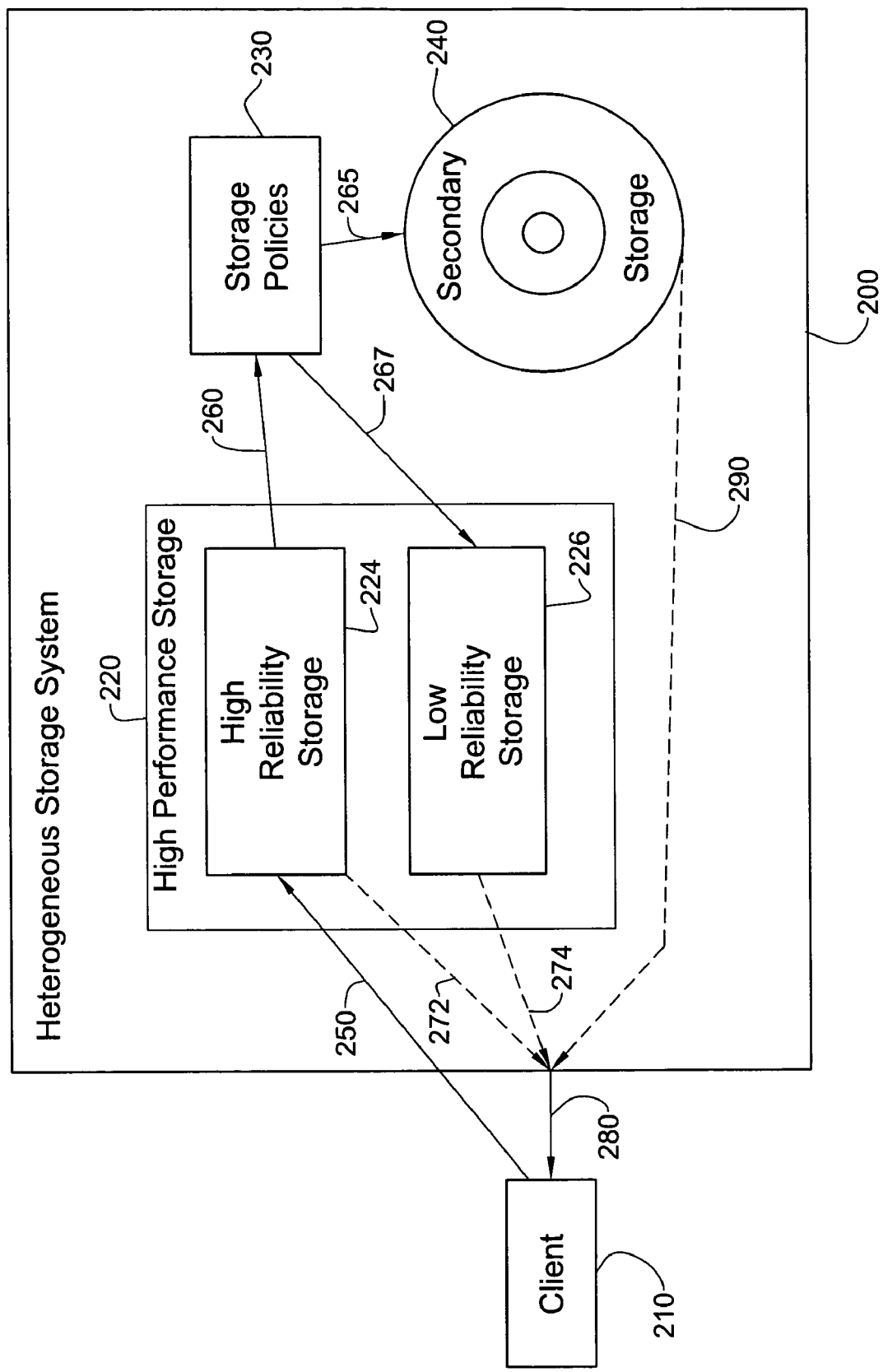
FIG. 2 illustrates the components and operation of a heterogeneous storage system, in accordance with a first embodiment of the present invention.

Referring now to the drawings, FIG. 2 illustrates a heterogeneous storage system 200 which allows storage and retrieval by client(s) 210, in accordance with a preferred embodiment of the present invention. System 200 is similar to system 100 in that system 200 comprises a high performance storage 220 and a secondary (low performance) storage 240. However in system 200, high performance storage 220 comprises both a high reliability storage 224 and an on-line low reliability storage 226 (whereas in system 100, the high performance storage 120 comprises only a high reliability storage). Heterogeneous storage system 200 can be concentrated in one physical location or distributed over a geographical area.

Client 210 shown in FIG. 2 represents all clients which access storage system 200 and does not necessarily always refer to the same client. For example the storing client may in some cases differ from the retrieving client.

The term "data" as used in the description refers to data in any format, for example text, image, sound, or any other format, as long as the format used is capable of conveying knowledge to the receiver(s) of the data.

When client 210 stores data in heterogeneous storage system 200 (arrow 250), the data is initially stored in high reliability high-performance storage 224. It is assumed that the data is eventually backed up on secondary (high reliability low performance) storage 240 (arrows 260 and 265), with the timing of the backup being determined by a storage policies sub-unit 230. Once the data has been backed up, the data can be transferred from high performance high reliability storage 224 to high performance low reliability storage 226 (arrows 260 and 267), with the timing of any transfer determined by storage policies sub-unit 230. Transferring means that the data is at least partially erased or freed from high performance high reliability storage 224, making space for new data coming in. Thus, as is well known in the art, data does not physically have to be removed from the high performance high reliability storage 224, it being sufficient to mark it as available so as to allow it to be over-written by new data.

In the retrieval process, client 210 requests retrieval of the data from heterogeneous storage system 200. The data is provided to client 210 (arrow 280). The data could have been retrieved from high performance storage 220 (either from high reliability storage 224-broken arrow 272, or from low reliability storage 226-broken arrow 274). If the data is not available in high performance storage 220, or the available data is not reliable, or for any other reason, the data can be retrieved from secondary storage 240 (broken arrow 290).

Storage policies sub-unit 230 can be any combination of software, hardware and/or firmware that performs the functions as defined and explained herein. Storage policies sub-unit 230 performs at least part of the management of the data stored in heterogeneous storage system 200, for example any or all of the following: data transfer between storage 224, 226 and/or 240, data backup on storage 240 and/or data deletion from storage 224, 226 and/or 240. It should be evident that although storage policies sub-unit 230 is illustrated in FIG. 2 as a single unit, in other embodiments the functions of storage policies sub-unit 230 may be dispersed over more than one sub-unit. It should also be evident that although storage policies sub-unit 230 is depicted in FIG. 2 as being internal to storage system 200, in other embodiments, storage policies sub-unit 230 may be external to storage system 200, possibly coupled to system 200 through an appropriate communications means.

Storage policies sub-unit 230 may trigger the backup of data onto secondary storage 240 based on the occupancy level of high performance high reliability storage 224, the availability of removable media for the secondary storage 240, the access to secondary storage 240, any characteristic(s) of the data (for example age, size, name, type, location, etc.), or any other factor. Preferably, backup of the data is performed as soon as possible after storing the data in storage 224 by client 210. Similarly storage policies sub-unit 230 may trigger the transfer of data from high performance high reliability storage 224 to high performance low reliability storage 226 based on the occupancy level of high performance high reliability storage 224, the availability of storage space in high performance low reliability storage 226, any characteristic(s) of the data (for example age, size, name, type, location, etc.), or any other factor. Preferably transfer of the data from storage 224 to storage 226 is performed soon after backup of the data in secondary storage 240. In no situation will data from storage 224 be moved to storage 226 before backup of the data in secondary (and reliable) storage 240.

Storage policies sub-unit 230 can also determine if and when the data is deleted from low reliability storage 226 (recalling that the data is in any event backed up on secondary storage 240). For example, the determination of whether and when to delete from low reliability storage 226 may depend on the occupancy level in low reliability storage 226, the availability of removable media in the secondary storage 240, the access to secondary storage 240, any characteristic(s) of the data (for example age, size, name, type, location, etc.), or any other factor.

A brief comparison of the reliability, performance and cost of system 200 compared to prior art system 100 is now presented. Note that because storage 226 is of low reliability, it is possible that data which has been transferred to storage 226 is at least partially illegible, for example because of data loss, data corruption, etc. However owing to the protocol described above for system 200, data which has been transferred to storage 226 has first been on-line backed up in high reliability secondary storage 240 and if needed it can be retrieved from secondary storage 240. Therefore reliability is not compromised in system 200 compared to prior art system 100. In addition, the performance of system 200 is not compromised compared to system 100 because both low reliability storage 226 and high reliability storage 224 are high performance storages. However, compared to system 100, cost is lowered in system 200, provided that at least a portion of the volume of (more expensive) high performance high reliability storage 120 in system 100 is replaced by (cheaper) high performance low reliability storage 226 in system 200 (i.e., provided that the size of high reliability high performance storage 224 is smaller than the size of high performance high reliability storage 120). Preferably, because high reliability storage 224 is more expensive than low reliability storage 226, the size of low reliability storage 226 is much larger than the size of high reliability storage 224.

The invention is not limited to specific media types. However for the sake of example, secondary storage 140 or 240 can be for example tapes or magnetic optics such as MO, CD, DVD, etc. High performance low reliability storage 226 can be for example a low reliability magnetic disk. High performance, high reliability storage 224 or 120 can be for example a reliable magnetic disk such as a RAID, etc.

In order to further demonstrate the usefulness of the present invention, the following example compares systems 100 and 200 comprising various media components with hypothetical costs. The example assumes that the following media components are available:

1. Inexpensive high performance, low reliability storage 226, for example a low reliability magnetic disk with a unit cost for example of $1;

2. Expensive high performance, high reliability storage 224 or 120, for example a reliable magnetic disk such as a RAID, etc. with a unit cost for example of $10;

3. Secondary storage 140 or 240, for example tapes on magnetic/optics (such as MO, CD, DVD, etc) with unit cost for example of 10¢.

By way of example, assume that both systems 100 and system 200 require 100 units of high performance storage 120 or 220 and 1000 units of secondary storage 140 or 240. System 100 then comprises 100 units of high performance high reliability storage 120 for a cost of 100×$10=$1,000. In addition, system 100 has 1000 units of secondary storage 140 for a cost of 1000×10¢=$100. Total cost of storage for system 100 is therefore $1,100. Therefore in this example, for N storage units of high performance storage 120, the total cost of system 100 is 11N Assume now that in system 200, the 100 units of high performance storage 220 comprises 10 units of high reliability storage 224 for a cost of 10×$10=$100 and 90 units of low reliability storage 226 for a cost of 90×$1=$90. Total cost of high performance storage 220 is therefore $190. In addition, system 200 has 1000 units of secondary storage 240 for a cost of 1000×10¢=$100. Total cost of storage for system 200 is therefore $290. Therefore in this example, for N storage units of high performance storage 220, the total cost of system 200 is 2.9N. System 200 is therefore more than 4 times less expensive than system 100.

Figure 3:
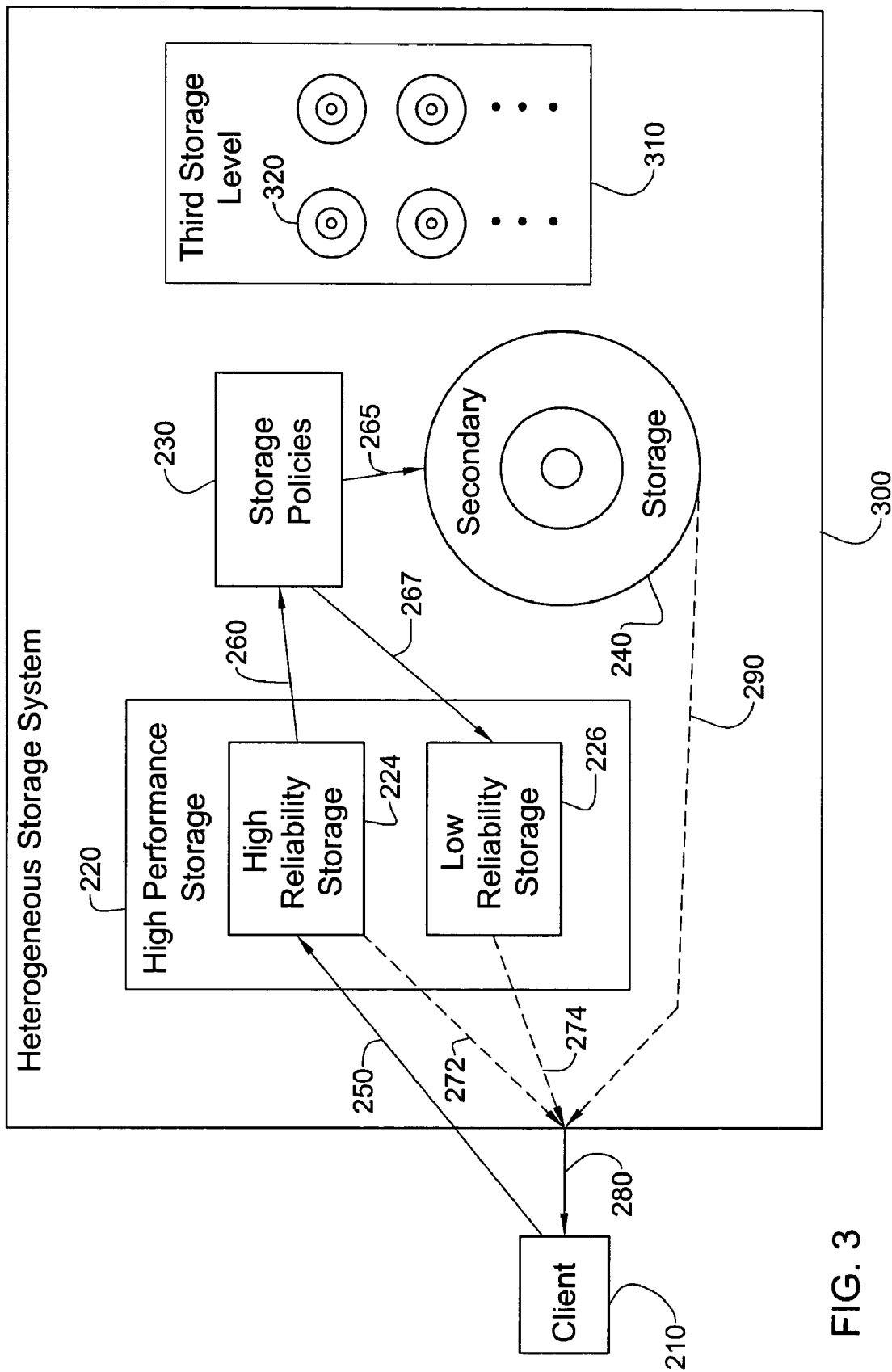
FIG. 3 illustrates the components and operation of a heterogeneous storage system, in accordance with a second embodiment of the present invention.

FIG. 3 shows a heterogeneous storage system 300 according to another embodiment including a third level of storage 310 (see FIG. 3). The third level of storage comprises, for example, one or more removable secondary storage media 320 that have been removed from the secondary storage 240. For example the third level of storage 310 can be a cabinet storing full secondary storage removable media, for example tapes, MOs, CDs, DVDs, etc. With the addition of this third level of storage, there is no practical limit to the storage volume that can be handled. When data on the removed medium is needed for retrieval, it is done via manual insertion of the medium into the secondary storage unit 240. It should be evident that if heterogeneous storage system 300 is compared to a prior art storage system similar to system 100 but which includes the same third level of storage 310 as system 300, the cost savings for system 300 versus the prior art system would be similar to the cost savings for system 200 versus system 100.

In some applications, heterogeneous storage system 200 or 300 may be combined with enhanced protocols to further ensure the reliability of the application. For example, in a medical image storage system which works under the Digital Image Communications in Medicine (DICOM) protocol, data typically, although not necessarily, in the form of medical images is sent for storage, acknowledged upon reception and stored safely. An enhanced protocol may optionally follow up with an archiving acknowledgment to the image originator (for example a medical imaging device/modality such as an magnetic resonance imaging (MRI) or computed tomography (CT)) when the images have been received and stored in a highly reliable storage, for example backed up. With the enhanced protocol, the originator may wait for the archiving acknowledgement before releasing local, size-limited memory space for further operations.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

While the invention has been described with respect to a limited number of embodiment, it will be appreciated that many variations, modifications and other applications of the invention my be made.

What is claimed is:

1. A method of storage management, the method comprising:
   storing data on a high reliability high performance storage medium;
   backing up said data on a high reliability low performance storage medium; and
   after said backing up, copying at least some of said data from said high reliability high performance storage medium to a low reliability high performance storage medium and freeing space occupied thereby on the high reliability high performance storage medium, wherein the terms "high" and "low" performance or reliability involve a separation of at least one order of magnitude in performance or magnitude, respectively
   wherein said high reliability high performance storage medium is configured to have a mean time between failure which is at least ten times higher than a mean time between failure which said low reliability high performance storage medium is configured to have.

2. The method of claim 1, wherein said data is classified according to characteristics thereof and is backed up at a rate that is dependent on the respective characteristics of said data.

3. The method of claim 1, wherein said data is backed up at a rate dependent on at least one from a group including at least: an occupancy level of said high reliability high performance storage, availability of back-up media and access to said high reliability low performance storage medium.

4. The method of claim 1, wherein said data include medical images.

5. A system for storing computer-readable media, said system comprising:
   a high performance high reliability storage medium configured for initial storage of data;
   a low performance high reliability storage medium configured for backup of data initially stored on said high performance high reliability storage medium; and
   a high performance low reliability storage medium, configured to receive data transferred from said high performance high reliability storage medium, after said data has been backed up on said low performance high reliability storage medium, wherein the terms "high" and "low" performance or reliability involve a separation of at least one order of magnitude in performance or magnitude, respectively
   wherein said high reliability high performance storage medium is configured to have a mean time between failure which is at least ten times higher than a mean time between failure which said low reliability high performance storage medium is configured to have.

6. The system of claim 5, further comprising: a storage policy sub-unit configured to determine when to backup data on said low performance high reliability storage medium.

7. The system of claim 6, wherein said storage policy sub-unit is also configured to determine when to transfer data from said high performance high reliability storage medium to said high performance low reliability storage medium.

8. The system of claim 5, wherein said high performance low reliability storage medium is higher volume than said high performance high reliability storage medium.

9. The system of claim 5, wherein said high reliability high performance storage medium is configured to allow at least ten times as many random read/write/rewrite operations per unit of time as said high reliability low performance storage medium is configured to allow.

10. The system of claim 5, further comprising: a third level of storage comprising at least one low performance high reliability storage media disconnected from said high performance high reliability medium.

11. A program storage device readable by machine, tangibly embodying a program of instructions executable by the machine to perform method steps of storage management comprising:
    storing data on a high reliability high performance storage medium;
    backing up said data on a high reliability low performance storage medium; and
    after said backing up, copying at least some of said data from said high reliability high performance storage medium to a low reliability high performance storage medium and freeing space occupied thereby on the high reliability high performance storage medium, wherein the terms "high" and "low" performance or reliability involve a separation of at least one order of magnitude in performance or magnitude, respectively
    wherein said high reliability high performance storage medium is configured to have a mean time between failure which is at least ten times higher than a mean time between failure which said low reliability high performance storage medium is configured to have.

12. A computer program product comprising a computer useable medium having computer readable program code embodied therein of storage management the computer program product comprising:
    computer readable program code for causing the computer to store data on a high reliability high performance storage medium;
    computer readable program code for causing the computer to back up said data on a high reliability low performance storage medium; and
    computer readable program code for causing the computer after said backing up, to copy at least some of said data from said high reliability high performance storage medium to a low reliability high performance storage medium and free space occupied thereby on the high reliability high performance storage medium, wherein the terms "high" and "low" performance or reliability involve a separation of at least one order of magnitude in performance or magnitude, respectively
    wherein said high reliability high performance storage medium is configured to have a mean time between failure which is at least ten times higher than a mean time between failure which said low reliability high performance storage medium is configured to have.

* * * * *